Patented Sept. 27, 1938

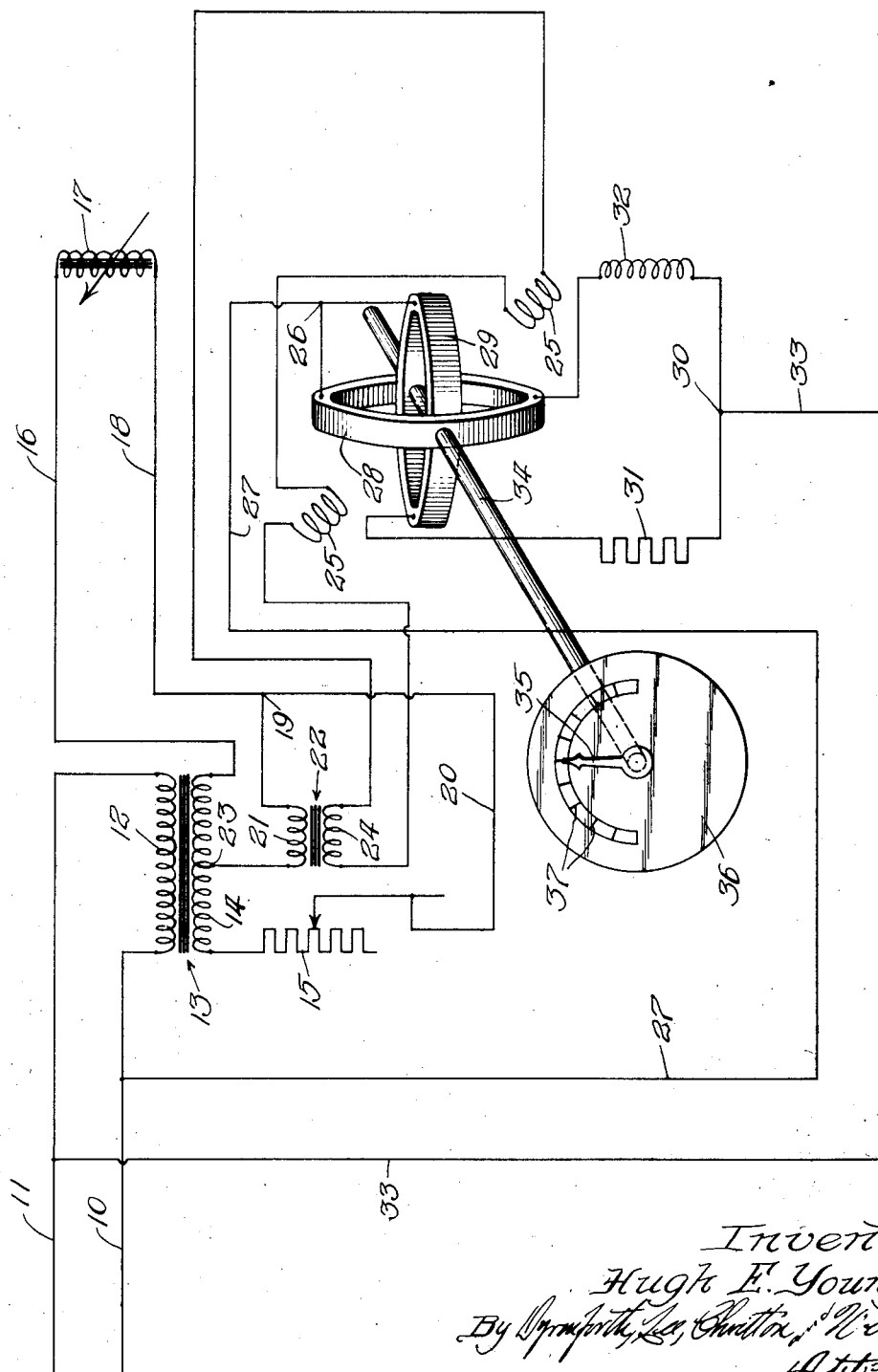

2,131,084

UNITED STATES PATENT OFFICE 2,131,084

REMOTE CONTROL INDICATOR

Hugh E. Young, Chicago, Ill.

Application June 29, 1934, Serial No. 733,095

1 Claim. (Cl. 177—351)

This invention relates to remotely controlled indicators, and more particularly to those wherein the control is by electrical means.

One feature of this invention is that it provides an indicator which accurately follows the movement of a control device located a considerable distance therefrom; another feature of this invention is that it requires only two wires between the indicator and the control point; still another feature is that no sliding contacts or mechanical relays are necessary; yet another feature is that it is operated by phase relationships between two currents; other features and advantages of this invention will appear from the following specification and the drawing, which is a schematic diagram of one embodiment of this invention.

Electrical means for remotely controlling indicators have long been known, but these means have had many disadvantages. They required a multiplicity of wires, many of the common devices requiring six wires between the indicator and the control plant. Other forms necessitated the same A.C. supply at the control point as was available at the indicator and some would operate only if this A.C. supply were a three-phase system. This invention derives all of its power from one transformer, having its primary attached to a single phase line, and has only two wires between the control point and the indicator. Moreover, since a relatively small current flows through these two wires there is very little heat loss, even when the control point is a mile or more distant. The device operates through changes in inductance, and consequently any line inductance introduced when the control point is a considerable distance from the indicator merely requires a slightly different initial setting of the indicator needle in order that it may correspond with the desired position at the proper point.

In the particular embodiment illustrated herewith A.C. lines 10 and 11 supply the primary 12 of a transformer 13. The secondary 14 of this transformer has one end thereof connected to a resistance 15, and the other end thereof connected to the line 16, which is one of the two lines which run to the control point. At the control point the line 16 connects to a variable inductance 17, as for example a variometer or an inductance coil having a movable core therein. The return circuit is completed through the lead 18 back to the point 19. This point 19 has connected thereto a lead 20 from the resistance 15 and from this point 19 a common return circuit is provided through the primary 21 of the transformer 22 to the center tap 23 of the secondary 14.

The secondary 24 of the transformer 22 supplies energy to the stator coils 25 of a power factor indicator. This power factor indicator has two movable coils mounted on a shaft at right angles to each other and follows the general practice in that these two coils are connected together at one end at the common point 26 from which point a lead 27 runs to one of the supply lines 10. The other ends of each of these movable coils 28 and 29 are connected together at the point 30, through the resistance 31 and the inductance 32. From the point 30 a lead 33 runs to the other supply line 11. The shaft 34 on which the movable coils are rigidly mounted has at one end thereof a pointer 35 in combination with a dial 36 and indicia 37.

In operation the supply lines 10 and 11 put line current through the moving coils 28 and 29 by means of the leads 27 and 33. The stator coils 25, on the other hand, are supplied with current through the phase splitting circuit deriving its energy from the transformer 13. Variations in the relationship between the inductance branch 17 and the resistance branch 15 will result in a shift in the phase of the current running through the primary 21 to the center point 23 of the supply transformer. Since the stator coils 25 are fed from the secondary 24 of this transformer, the phase of the current through the stator coils can be as much as 180° out of phase with that through the movable coils. Moreover, variation of the inductance 17 is sufficient to shift the phase of the voltage applied to the stators practically throughout the entire range of 180°. Since the power factor meter operates as a result of phase differences between the various coils, it is easily seen that a variation in the phase of the current supplied to the stators will cause a movement of the coils 28 and 29, which movement will be transmitted through the shaft 34 to the pointer 35.

The device whose movements it is desired to indicate may be attached by any convenient mechanical means to the variable inductance 17, and the indicator dial 36 may be simply calibrated to read directly the motion of the device attached to the variable inductance.

The power factor meter and associated circuits are to be designed in accordance with the amount of power needed. Merely as an indicator, however, very little power is required to operate this device and thus very little loss is occasioned in lines 16 and 18.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new, and desire to secure by Letters Patent, is:

In means for indicating movement of a remote member, an alternating current supply circuit, a power factor meter having a movable coil and a stationary coil, one of said coils being connected to said supply circuit, and a variable phase shifting network also connected to said supply circuit and capable of producing a variable shift of voltage for substantially 180°, the other coil of said meter being connected to the output of said network, the latter being arranged in an electrical bridge circuit comprising a supply transformer having a center tap and forming two equal arms of the bridge and two impedances having a difference of approximately 90° in phase angle forming the other two arms of the bridge, one of said impedances being variable responsive to movements of said member and controlling the amount of phase shift, the indication of said meter being obtained from the phase of the voltage.

HUGH E. YOUNG.